United States Patent [19]

Föhl

[11] 4,109,881
[45] Aug. 29, 1978

[54] WINDING-UP DEVICE WITH AUTOMATIC LOCK INITIATED BY FRICTION FOR A SAFETY BELT

[76] Inventor: Artur Föhl, Schelmenwasenstrasse 68, 7061-Haubersbronn, Fed. Rep. of Germany

[21] Appl. No.: 570,199

[22] Filed: Apr. 21, 1975

Related U.S. Application Data

[62] Division of Ser. No. 343,887, Mar. 22, 1973, Pat. No. 3,921,930.

[30] Foreign Application Priority Data

Mar. 24, 1972 [DE] Fed. Rep. of Germany ....... 2214307
Jun. 19, 1972 [DE] Fed. Rep. of Germany ....... 2229662
Aug. 23, 1972 [DE] Fed. Rep. of Germany ....... 2241357

[51] Int. Cl.² .................. A62B 35/02; B65H 75/48
[52] U.S. Cl. .................. 242/107.4 A; 242/107.4 B
[58] Field of Search ............ 242/107.4 R–107.4 E; 280/744–747; 297/388

[56] References Cited

U.S. PATENT DOCUMENTS

| 3,343,763 | 9/1967 | Spouge | 242/107.4 B X |
|---|---|---|---|
| 3,482,799 | 12/1969 | Wrighton et al. | 242/107.4 B |
| 3,632,058 | 1/1972 | Stoffel | 242/107.4 B |
| 3,711,037 | 1/1973 | Jakob | 242/107.4 B |
| 3,741,496 | 6/1973 | Beller | 242/107.4 B |
| 3,787,002 | 1/1974 | Hayashi et al. | 242/107.4 B |

*Primary Examiner*—Harvey C. Hornsby
*Assistant Examiner*—John M. Jillions
*Attorney, Agent, or Firm*—Walter Becker

[57] ABSTRACT

A winding-up device for a safety belt in which a winding shaft connected to one end of the belt is normally freely rotatable in both pay-out and take-up direction in a housing. A locking arrangement is provided for locking the shaft to the housing and is operated in response to acceleration of the shaft in pay-out direction. Further means can be provided to operate the locking device in response to acceleration of the housing or of the vehicle in which the housing is mounted.

12 Claims, 30 Drawing Figures

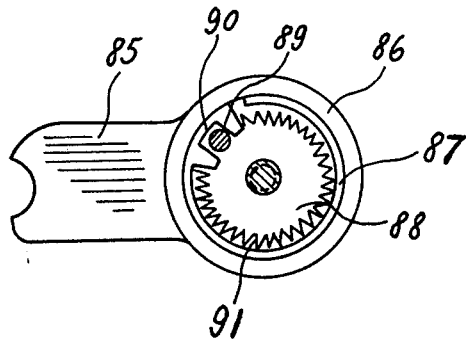
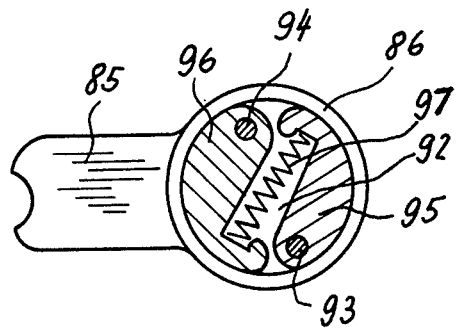
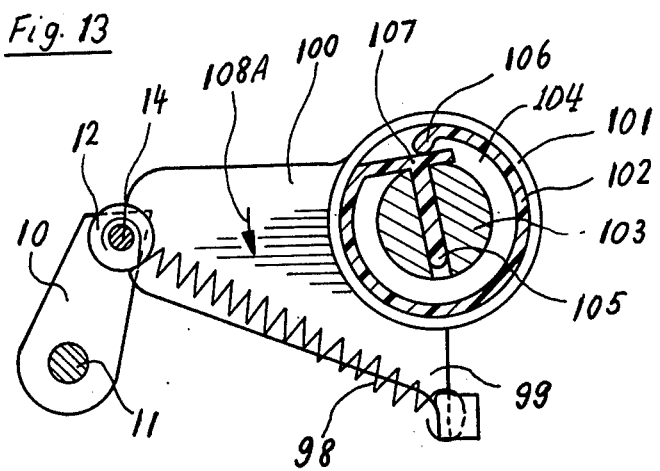

WINDING-UP DEVICE WITH AUTOMATIC LOCK INITIATED BY FRICTION FOR A SAFETY BELT

This is a division of co-pending application Ser. No. 343,887—Föhl filed Mar. 22, 1973, now U.S. Pat. No. 3,921,930—Föhl issued Nov. 25, 1975.

The present invention relates to a winding-up device with an automatic locking mechanism for a safety belt for protecting the passengers of a motor vehicle or airplane, said winding-up device being provided with a winding-up shaft that is coupled to a return spring and carries a wound-up portion of the belt. The winding-up shaft is rotatably journalled in a housing serving as base frame and during normal movements of the user permits a winding-up and winding off of the belt. The winding-up device furthermore comprises a locking mechanism which at a rotary acceleration of the winding-up shaft effected in the pulling-out direction of the belt and exceeding a predetermined limit, will bring about a positive connection between said winding-up shaft and the housing.

A winding-up device has become known in which the winding-up shaft serving as winch is provided with annular flanges of which at least one is arranged opposite a pressure plate and is coupled thereto by balls acting as inertia masses. The receiving portions for said balls arranged in oppositely located surfaces of the flange and the pressure plate are provided with inclined surfaces which ascend in the circumferential direction and which in response to an acceleration exceeding a predetermined limit, when the belt is being pulled out, press the pressure plate and the annular flange away from each other whereby a gear ring provided on the other end face of the pressure plate is brought into mesh with a counter gear ring provided in the housing. This winding-up device, however, not only is rather heavy and has relatively large dimensions but is also expensive to manufacture. This is due in particular to the fact that the two spur gear rings and the pocket-shaped recesses for receiving the coupling balls will work precisely only after a very careful mechanical machining.

It is, therefore, an object of the present invention to provide a winding-up device of the above mentioned general type which will be composed of a minimum of parts that can be produced in simple mechanical machining operations, while the device itself will have a relatively light weight and will be able in an emergency to withstand the pull load caused by the mass of the user.

These and other objects and advantages of the invention will appear more clearly from the following specification in connection with the accompanying drawings, in which:

FIG. 11 is a top view of the control element with an inner band-shaped coupling device according to a further development of the invention.

FIG. 12 is a top view of the control elements with a clutch design as inner jaw brake.

FIG. 13 is a top view of a spring-free inner band clutch of the control elements.

Figure 1:
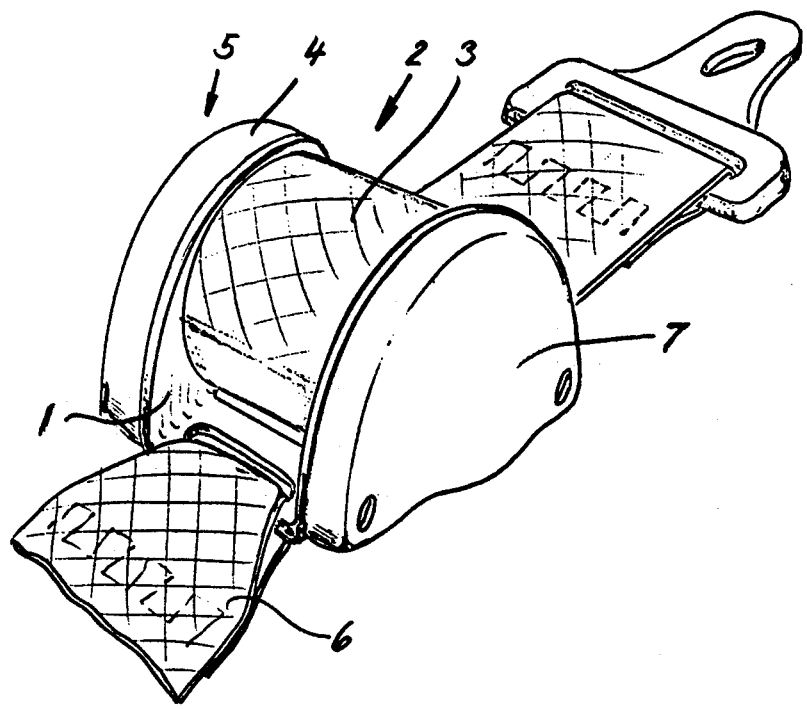
FIG. 1 is an isometric view of a winding-up device according to the invention.

The winding-up device according to the present invention, which is provided with an automatic locking device for a safety belt and comprises a winding-up shaft which carries a wound-up portion of the belt and while being coupled to a return spring is rotatably journalled in a housing serving as base frame and at normal movements of the user permits a winding up and winding off of the belt while additionally a locking device is provided which in response to rotary accelerations of the winding-up shaft exceeding predetermined limit values brings about a positive connection between said shaft and the housing, is characterized primarily in that a control device is coupled to the winding-up shaft through the intervention of frictionally and positively acting forces, while said control member cooperates with a spring-loaded pawl and moves said pawl into locking position when said limit values are exceeded.

A device of this type, which only in an emergency moves into its blocking position, will permit the user to carry out any desired movement which is not effected by outer influences. Only in case of emergency or dangers for instance caused by extreme acceleration forces brought about by an impact or excessive retardation of the vehicle or airplane, will the blocking device become effective and prevent the safety belt from being rolled off from the winding-up device so that the user can be caught with the belt occupying the position prior to the respective danger or emergency. To realize the above conditions, it is provided according to the invention that a control element cooperating with a spring-loaded pawl is coupled to the winding-up shaft through frictional and positively acting forces, while said control element cooperates with the spring-loaded pawl and moves the latter into blocking position when the intended upper acceleration limit for the winding-up shaft has been exceeded. To this end, the control element may be designed as a one-arm lever which at one of its two end sections has a preferably thin-walled hub by means of which said lever is journalled on the circumferential surface of an extension coupled to the winding-up shaft. A particularly advantageous structural simplification will be obtained when according to a further development of the invention the hub is fixedly connected to the lever and has a slot which is located in the vicinity of the non-elastic connection zone between the lever and the hub while the elastic residual hub section is toward its free end looped around the extension in the direction of rotation as it occurs when the belt is pulled out. In view of this design of the hub of the lever, a kind of band-slip clutch is obtained, the follower moment is adapted to be influenced by the selection of the location of said slot and which can be so set that the frictional follower moment effective on the lever is when the belt is being pulled off a multiple of what it is during the winding-up operation.

It is particularly advantageous when the hub which is fixed by the slot for a limited looping angle has a looping angle opposite an extension connected to the winding-up shaft, which amounts to at least 180°, preferably to from 210° to 270°. Advantageously, the outer surface of said extension may be provided with a groove in which the hub of the lever is axially guided. The acceleration value at which the blocking device is supposed to respond may in a particularly effective manner be fixed by providing a concave recess at the other end section of the lever, which recess is engaged by a spring-loaded pawl when the blocking device is ineffective. When the preset acceleration value is exceeded, the lever is lifted out of said recess and then permits the pawl to engage its blocking position. Advantageously, the pawl may be pivotable about an axis which is parallel to the winding-up shaft and may according to a further feature of the invention cooperate with an arresting disc which is coaxial with the winding-up shaft and is preferably non-rotatably connected thereto. This arresting disc has a plurality of ratchet teeth which are distributed over the circumference of said disc. These ratchet teeth may expediently be provided with a back which ascends radially in the pulling out direction of the winding-up shaft while the tooth face intersects with the back of the teeth at an angle which is less than 90°. In this way, it will be assured that the pawl occupying its blocking position due to the high pressure which an arresting tooth exerts in view of the strong pull occurring in case of danger cannot be displaced from its engaging position. For a precise maintenance of the preset acceleration value, it is advantageous when the pawl has a rotatably mounted control roller which when the blocking device is in its ineffective position engages the concave recess of the lever and in this way retains the pawl with slight play out of engagement with the blocking device or arresting disc. According to one of the possible embodiments, the pawl may be in the form of a nose which is formed onto an oblong metal strip which latter is pivotable about one of its two longitudinal edges and with this longitudinal edge rests at the bottom of a sector-shaped cutout in one of the housing walls which cutout simultaneously limits the tilting range of the metal strip. For fixing the frictional follower moment which determines the limit of the belt acceleration and is effective between the winding-up shaft and the lever, according to a preferred embodiment, there is provided a corresponding spring which furnishes a definite pressing force by means of which the hub of the lever is held loaded against the extension connected to the winding-up shaft. In this connection, the hub of the control lever becomes effective in the manner of a band-slip clutch while, by selecting the location of the slot in the hub, it is possible to have the frictional follower moment engaging the lever in the belt pull out direction to reach a value which is a multiple of the moment which occurs when winding-up the belt.

Instead of such band-slip clutch, for purposes of fixing the frictional follower moment which determines the limit value of the belt acceleration and which is effective between the winding-up shaft and the lever, there may be provided a magnetic or electromagnetic coupling. In this connection, a structurally simple solution is obtained when the extension serving for mounting the lever consists of ferro-magnetic material and in the immediate vicinity of the bearing zone of the lever there is arranged a small permanent magnet or a small electromagnet. If the winding-up device is to withstand extremely high acceleration forces and a slight increase in the cost is permissible, the pawl may in conformity with a further development of the invention be employed as precontrol lever which serves merely for initiating the blocking operation while itself it has not to absorb any mechanical loads occurring during the blocking operation. To this end, the blocking device may comprise an arresting or ratchet disc which cooperates with the pawl and which is rotatable relative to the winding-up shaft over a limited angle and during its rotation is by means of a supporting disc which is fixedly mounted on the winding-up shaft and has a plurality of axial cams ascending with its inclined surfaces in the direction opposite to the direction of withdrawal of the belt and which is axially displaceable against the thrust of a disengaging spring until it engages stationary blocking cams arranged on one of the housing walls. A particularly effective arrangement is obtained when in conformity with a further development of the invention, a coupling disc is, preferably in one piece, connected to the ratchet disc. The coupling disc has that end face thereof which faces the housing wall provided with counter teeth which during the axial displacement of the coupling disc mesh with the blocking cams provided on the housing wall. The winding-up device according to the invention may in a simple manner be further improved by designing the control member as a one-arm control lever which at one end section has a hub by means of which the control lever is coaxially pivotally arranged with regard to the winding-up shaft. The free end of said control lever cooperates with the pawl. Furthermore, a coupling medium is provided which for initiating the blocking operation brings about a frictional and/or positive rotary connection between the hub and the winding-up shaft. In this way, a device is created which in each position of the winding up device has a particularly fine sensitive control.

With this further development of the control member, it is possible to employ the principle of the outer band brake as well as the principle of the inner band brake or the jaw brake for obtaining a frictional rotary movement. Expediently, for mounting the hub of the control lever, a cylindrical extension is provided which is coaxial with the winding-up shaft. This extension is non-rotatably connected to the winding-up shaft. At the free end of this extension, there may advantageously be provided an eccentric follower pin while the hub forms a brake drum and is connected to the follower pin of one of the two ends of an inner brake drum. In this way, when a jerky belt pull occurs which exceeds the preset acceleration value, an immediate frictional connection is established between the winding-up shaft and the control element.

By means of a correspondingly selected spring, there exists in this connection the possibility of pressing the inner brake band against the hub designed as brake drum. According to a further feature of the invention, the inner band brake may be so designed that a pressing spring can be omitted without affecting the response sensitivity. For purposes of solving the problem of this detail, the extension may at its free end be continued with an offset diameter. The extension may be provided with a transverse slot, and the band brake may be so designed that a free angled-off end is adapted to be fitted into said transverse slot while the other end engages this arm within the region of the angled-off portion. When the winding-up shaft is accelerated in the direction of rotation in a jerky manner by a pullout of the belt, it will be appreciated that in view of the suspension in the extension member, a spreading of the inner brake band toward the drum wall of the hub of the control part is effected with the result that a frictional connection will be established for initiating the blocking operation. Advantageously, a flexible synthetic material with favorable friction values is employed as material for the inner band brake which is inexpensive as to its manufacture. Instead of an inner band brake, by corresponding structural changes, also an inner jaw brake may be employed without affecting the control function.

Within the framework of the development, it is to be expected that the safety authorities of the individual countries will issue laws which require a still higher sensitivity of response of such winding-up devices. In order to take into consideration such development, it is possible according to the present invention by the provision of additional inertia masses to initiate the blocking operation with every belt withdrawal acceleration value prescribed by the law of the respective country.

To this end, in further development of the invention, it is suggested with each winding-up device of the above mentioned type which contains a control element of the type described above, that coaxially with regard to the winding-up shaft and with regard to the hub of the control lever there is provided a body of inertia which is loosely fitting and is rotatable relative to these parts, especially an inertia disc, which carries at least one eccentrically located control means. This control means will at a relative movement between the inertia body and the winding-up shaft as it occurs at acceleration of the belt withdrawal bring about a frictional and/or positive connection between the winding-up shaft and the hub for initiating the blocking operation. According to a preferred embodiment of the invention, this inertia disc has its sides thereof which face the control lever and its hub provided with a radially extending follower cam which at the same time may be taken advantage of for centrally reinforcing the inertia disc at its bearing bore.

According to a further development of the invention, it is suggested that the axle bolt of the winding-up shaft is extended and is employed for a friction low mounting of a corresponding inertia body which has a control cam which is connected to or engages that free end of the inner band brake which is not connected to the extension.

If now the winding-up shaft is accelerated in a jerky manner, one end of the inner band brake is taken along in the direction of rotation through the intervention of a follower pin of the extension, whereas that end which is in operative engagement with the inertia mass is in view of the mass inertia briefly retained which means that the inner band brake engages the brake drum-shaped hub and instantaneously frictionally takes along the control part. By suitably dimensioning the inertia body, the control can be set for any desired limit value of the belt acceleration. A spring as it is necessary with the design having no mass inertia disc, can be omitted in this instance.

In this way, it will be assured that with normal belt withdrawal movements on the part of the user, no frictional moment occurs between the winding-up shaft and the control member and thus, the control system is not subjected to wear. With this design, the tension spring is no longer fixedly connected to the housing but is connected to the control part in such a way that the pawl will always by its spring force be pulled into its rest position. In view of this arrangement, it will simultaneously be assured that in the absence of a frictional moment during the winding-up operation, the control member will return to its starting position and be locked therein. Moreover, this type of spring arrangement has the advantage that at a slight pulling out movement, the storage force of the spring will suffice completely in order to return the control part to its starting position. In practice, this operation may be aided by the back of the teeth of the ratchet disc; the pawl is pressed radially outwardly and will thus in an accelerating way act upon the entire operation.

According to a further development of the invention, a spring looped around the hub of the control member is approximately within the region of the non-elastic connecting zone between the lever and the hub of an inertia disc mounted on the extended axle bolt, operatively connected in such a way that during a jerky belt withdrawal, which means with a jerky acceleration of the winding-up shaft, the inertia disc will in view of its mass inertia somewhat lag whereby the surrounding spring is loaded so that for the initial pressure there will be available a considerably high frictional moment and a quick and safe initiation of the blocking operation will be secured.

Whereas with the above described designs the blocking operation is initiated by frictional forces acting upon the precontrol system, it is possible by slightly modifying the precontrol elements to obtain a positive control start. This may be realized in various manners which will presently be set forth.

The brake drum-shaped hub portion of the control part is provided with saw-shaped teeth arranged parallel to the axis of the winding-up shaft, and on the extension there is journalled a pivotable latch which is kept in its starting position by means of a spring. Opposite the pivot bearing point, the latch is designed in the manner of a tooth. Likewise in this range, the said latch rests against an eccentrically arranged control cam of an inertia disc journalled on the axle bolt. The spring, which keeps the latch in its starting position, is so dimensioned that at a predetermined limit value the latch is instantaneously radially pivoted outwardly by means of the control cam of the inertia disc due to a relative rotation between the winding-up shaft and the inertia disc so that it will get into cooperation with the hub having inner teeth and will take the control part along in pulling out direction whereby the blocking operation is safely initiated. Another positive control connection may be realized by arranging saw-shaped teeth on the outside of the hub and by having the latch mounted on the extension extend over the rim of the hub while the inertia disc with its eccentrically arranged control cams is so designed that in response to a jerky pull-out of the belt, the latch pivots radially inwardly thereby effecting a positive connection between the drive shaft and the control part. This embodiment excels by the employment of particularly simple and inexpensive elements.

When the winding-up device is firmly connected to the vehicle, a blocking operation in the winding-up device is initiated in response to the fixed minimum value of the belt pull-out acceleration. With such fixed arrangement of the winding-up device on the vehicle, it might additionally be required that the winding-up device will be controlled or blocked in conformity with the driving acceleration.

This requirement can with a winding-up device according to the invention be met without materially changing the fundamental construction, and this may be effected for instance in the following manner:

(a) A mass element which at a predetermined acceleration or retardation of the vehicle leaves its normal position and then moves into a position where it blocks the inertia disc and thus initiates a blocking operation, may be operatively connected directly or indirectly with the inertia disc.

(b) An electric control device responding to accelerations and/or retardations may be connected to the vehicle, which control device releases a signal when a fixed value of the acceleration or retardation is exceeded. Preferably, an electric signal is emitted by means of which an electromagnetic, pneumatic or hydraulic auxiliary force is initiated which brakes the inertia mass.

(c) With an electromagnetic, pneumatic or hydraulic auxiliary force which is controlled by a control device in conformity with accelerations or retardations according to (b) supra, the control lever provided in conformity with the invention may be pivoted from its normal position in the direction of rotation in which the pull-out of the belt is effected so that the spring-loaded pawl can move into its blocking position.

With these last mentioned three embodiments, in addition to the control by the belt withdrawal acceleration, there is also effected a blocking control by the vehicle acceleration. If the control in conformity with the belt pull-out acceleration is not necessary, the inertia disc with its following elements which serve for taking the control lever along may be discarded. In various cases of application, the control device which is set forth under (c) and operates in conformity with the acceleration or retardation of the vehicle, will suffice for the initiation of the blocking operation.

Referring now to the drawings in detail, the arrangement shown therein in FIG. 1 illustrates the overall construction of the winding-up device which comprises primarily a housing 1 which is U-shaped and made of a flat iron. Rotatably journalled in said housing 1 is a winding-up shaft 2 with a belt coil 3 provided on said winding-up shaft 2. The winding-up shaft 2 is connected to a spiral return spring 5 which is mounted in a spring housing 4. The housing 1 is flexibly connected to a non-illustrated vehicle or airplane by means of a belt means 6. Below a cover 7 there are arranged control and blocking elements according to the invention which will now be described.

Figure 2:
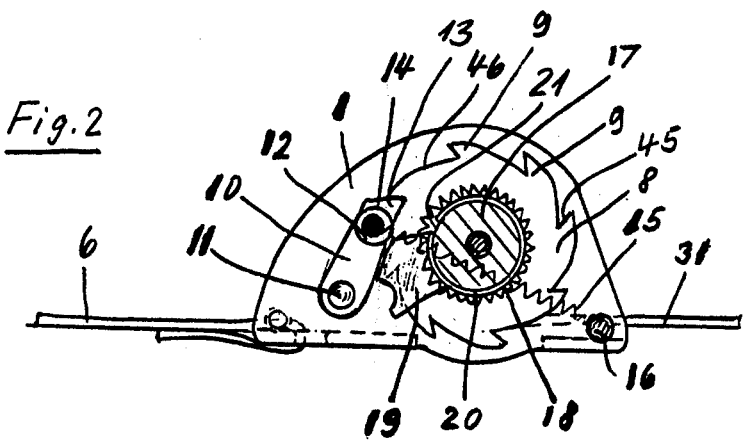
FIG. 2 is a top view of the control and blocking elements of the winding-up device according to FIG. 1 with the cover cap removed.

FIG. 2 illustrates a ratchet disc 8 which is firmly connected to the winding-up shaft 2 forming a belt sleeve. A pawl 10 is arranged on housing 1 and is pivotally mounted on a bearing bolt 11 which is riveted to the housing 1. The bearing bolt 11 extends parallel to the axis of the winding-up shaft 2. A bearing pin 14 laterally protrudes from the pawl 10 in the vicinity of its free end. Suspended on said pin 14 is one end of a tension spring 15 whereas its other end is by means of a screw 16 connected to the housing 1. Coaxially with and connected to the winding-up shaft 2 is a cylindrical extension 17 which comprises a flat groove 18 for mounting a control lever 19. This lever 19 forms one piece with a thin hub portion 20 which comprises a slot 21 and by means of which hub portion 20 the lever 19 is inserted into the flat groove 18. Slot 21 is in the immediate vicinity of the connecting zone arranged between the lever 19 and hub 20 in such a way that the remaining hub portion is elastically and in the manner of a band looped around the extension 17 in the pulling-off direction of shaft 2, which pulling-off direction is indicated by the arrow 41. The control lever 19 is made together with the hub portion 20 of an elastic material for instance of polyamide. The hub portion 20, the bore of which approximately equals the diameter of the flat groove 18, can when being slightly bent open, be pushed over the extension 17 and can then snap into the flat groove 18. In order to obtain a definite connection between the hub portion 20 and the extension 17, the hub portion 20 has mounted thereon a tension spring in the form of an annular spring 22. In this way, a frictional but rotatable connection is established between the extension 17 and the control lever 19. For axially securing the annular spring 22, the outer circumference of the hub portion 20 is provided with a narrow groove 23.

Figure 3:
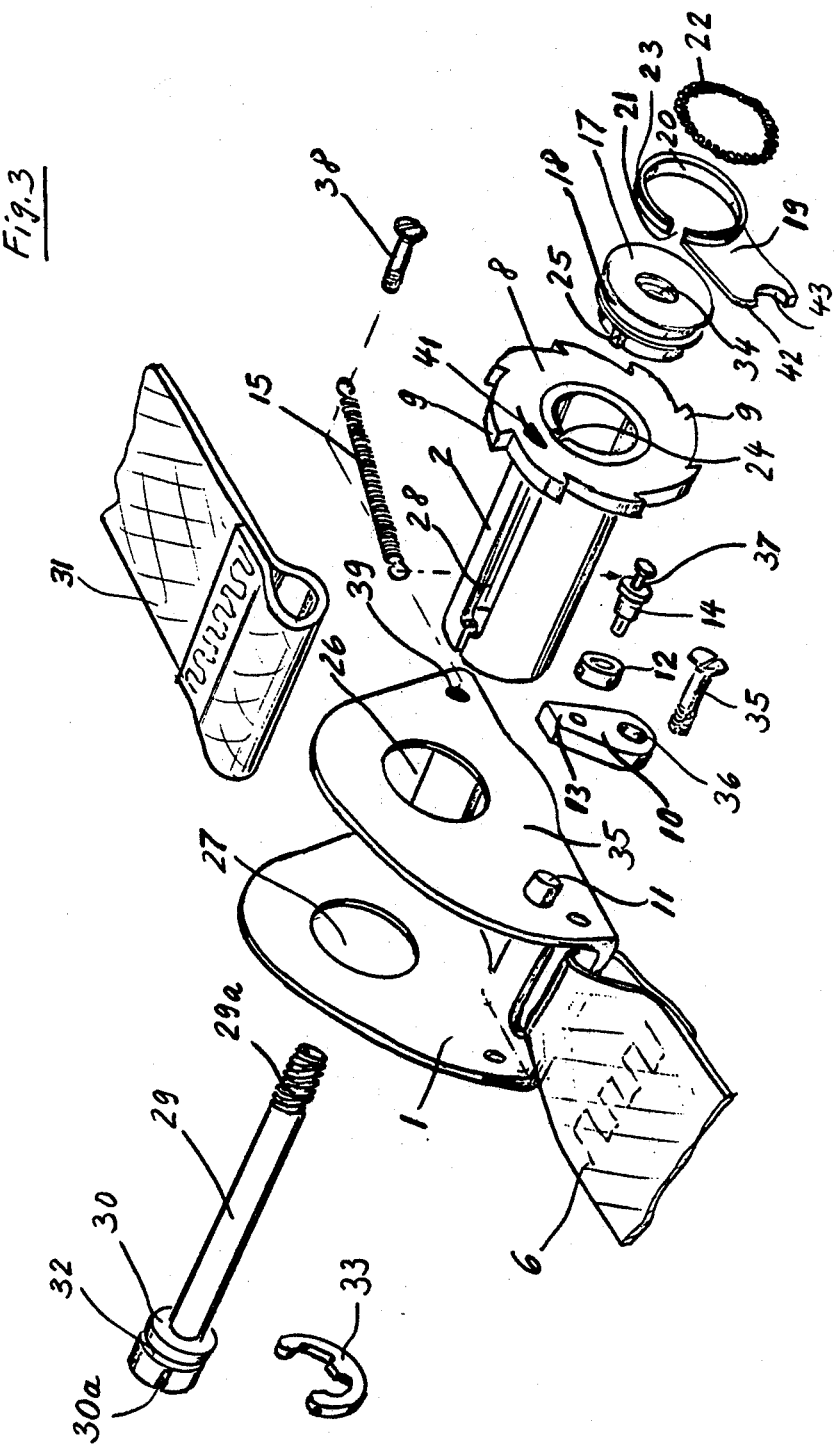
FIG. 3 is an exploded view of the device according to the invention showing the individual elements thereof.

The winding-up shaft 2 is formed by a rolled metal strip and is by welding, hard soldering, pressing or the like firmly connected to the ratchet disc 8. Within the region of the ratchet disc 8, between the two longitudinal edges of the metal sheet forming the winding-up shaft 2 there is provided a narrow gap which forms a radially extending groove 24 into which fits a follower 25 on the extension 17. After the winding-up shaft 2 has been inserted into the two bores 26 and 27 of the housing 1, the belt 3 to be wound on can, while forming a loop according to FIG. 3, be inserted through the longitudinal slot 28 of the winding-up shaft 2 and can be connected by means of a bolt 29. The bolt 29 has one of its ends provided with a collar 30 which with a small radial play fits into the bore of the winding-up shaft 2. The return spring 5, which is covered by the spring housing 4 but is not shown in detail, is with its inner spring end connected in a transverse slot 30a of the collar 30. The collar 30 is furthermore provided with a groove 32 for receiving a spring ring 33 which axially arrests the bolt 29. After passing the bolt 29 into the bore of the shaft 2, the front thread 29a of the bolt 29 can be screwed into the inner thread 34 of the extension 17 thereby rotatably locating the shaft 2 in the housing 1.

Figure 4:
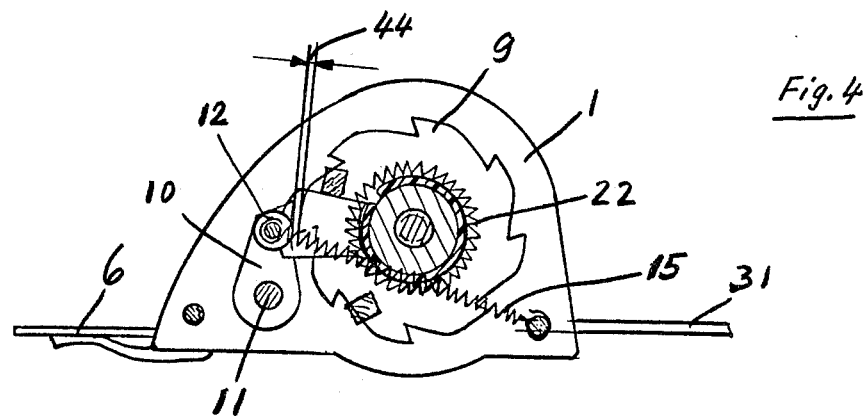
FIG. 4 is an axial view of the winding-up device according to the invention at the time when it is called upon to function.

The pawl 10 which by means of its bore 36 is pivotable on the bearing bolt 11 connected to the housing is limited axially by the cover cap 7. The bearing pin 14 in the vicinity of the free end of pawl 10 carries a loose control roller 12 and has a groove 37 for receiving one end of the tension spring 15 the other end of which is connected to a connecting screw 38 screwed into a threaded bore 39 in housing 1. That end edge of the control lever 19 which faces away from the hub portion 20 has an arced cam portion 42 which when viewing in the direction of rotation 41 of the shaft 2 ascends, said direction of rotation 41 is the direction of rotation of the winding-up shaft 2 when pulling out the belt. The cam portion 42 merges with a concave recess 43. The recess 43 is engaged by a control roller 12 which is rotatably arranged on the bearing pin 14. The control roller 12 is adapted at a slight distance 44 to keep the pawl out of engagement with the ratchet teeth 9 of ratchet disc 8 so that at low acceleration values, the belt 31 will under the influence of the tension spring 5 be wound onto the winding-up shaft 2 or will be able to be wound off from the shaft 2 when the belt is being pulled out. This loosening position of the locking device is illustrated in FIG. 4. The return spring 5 sees to it that the belt will always remain under the pull even though slight and consequently will with a slight pressure engage the body of the user.

If, however, in response to a sudden retardation of the vehicle or airplane, the user, so to speak, drops into the belt and consequently a sudden pulling force in the pull-out direction 41 becomes effective, a high friction-follower moment builds up between the extension 17 and the hub 20 of the control lever 19. The control lever 19 then pivots in a counter clockwise direction while the control roller 12 leaves the arresting recess 43 against the increased pull of the spring 15. In the course of a further taking along of the control lever 19, the latter will as seen from FIG. 5 release the pawl 10 so that the pawl 10 tilts in front of the tooth breast 45 of the next following tooth 9 of the ratchet disc and prevents a further withdrawing movement of the winding-up shaft 2. This blocking position is shown in FIGS. 2 and 6.

In order to make sure that also with strong pulling forces exerted upon the belt 31, the pawl 10 will not leave its positive engaging position, the intersecting angle formed by the tooth breast 45 with the back 46 of the tooth on each of the teeth 9 is selected less than 90°. Moreover, the end section 13 of the pawl by means of which the pawl engages between two teeth, is wedge-shaped.

When relieving the belt and during the subsequent winding-up operation, a slight rotary movement of the winding-up shaft 2 will suffice to cause the spring-loaded pawl 10 by means of the tooth back 46 in front of pawl 10 (when looking in the belt withdrawal direction) to tilt outwardly to the periphery of the ratchet disc 8. In view of the frictional engagement with the preloaded hub portion 20, the control lever 19 follows in the winding-up direction. In this connection, its ascending cam portion 42 engages the control roller 12 of the pawl 10 so that the latter is pressed further outwardly to the starting position shown in FIG. 4. The unlocking operation is in this connection effected over a rotary angle range of the shaft 2 which at a maximum corresponds to the pitch of the ratchet disc 8. This structural design is provided in order that with a jerky first pull-out of the belt starting from the full coil after effected locking, the return angle will not be greater than the rotary angle of shaft 2 necessary for a blocking operation.

Figure 10:
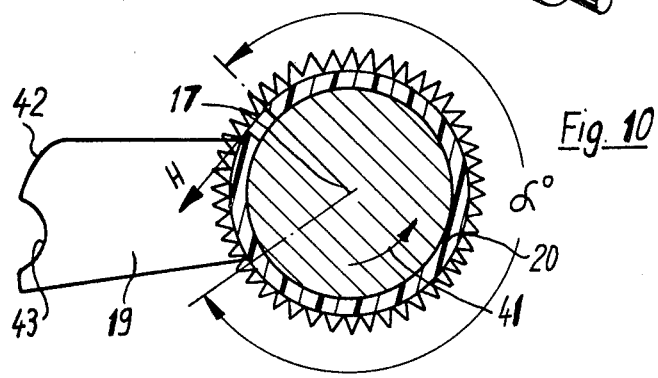
FIG. 10 illustrates the principle of the control lever employed with all embodiments and mounted in a brake band-like manner.

As will be seen from FIG. 10, the elastic hub portion 20 is looped around the extension 17 in the direction toward its free end with the pull-out direction of rotation 41 continuing in the same direction through an angle $\alpha$ which possibly should exceed 180° and with the specific embodiment illustrated in FIG. 10 amounts to approximately 270°.

Figure 5:
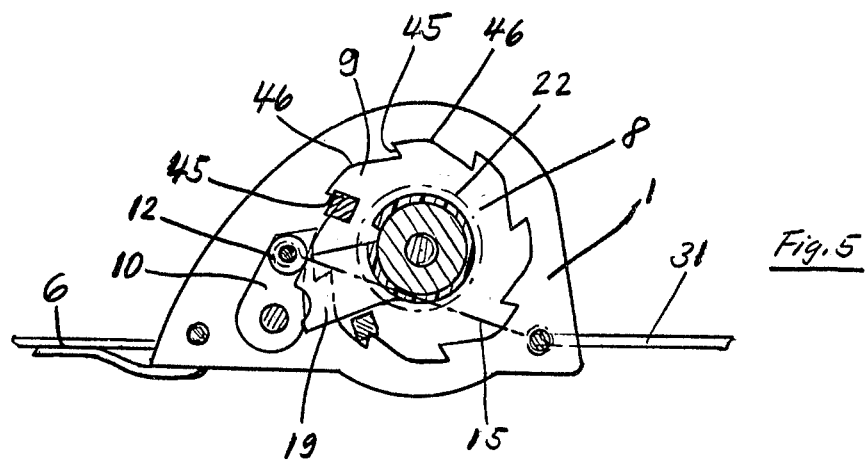
FIG. 5 shows the device according to the invention during the time when it begins its blocking action.
Figure 6:
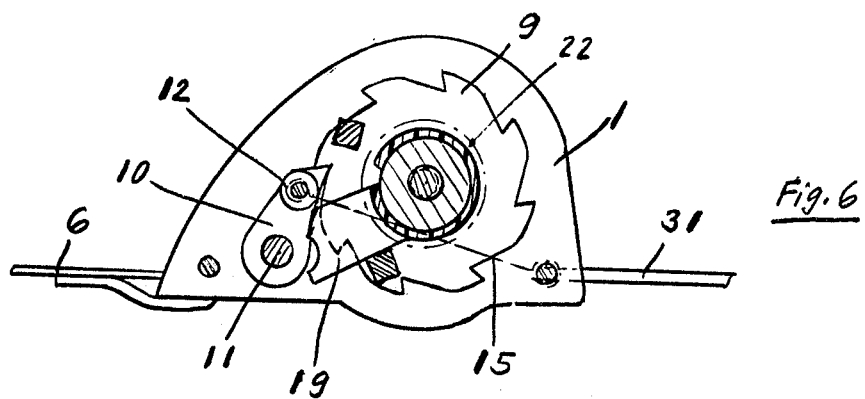
FIG. 6 shows the device according to the invention in its blocking position.
Figure 7:
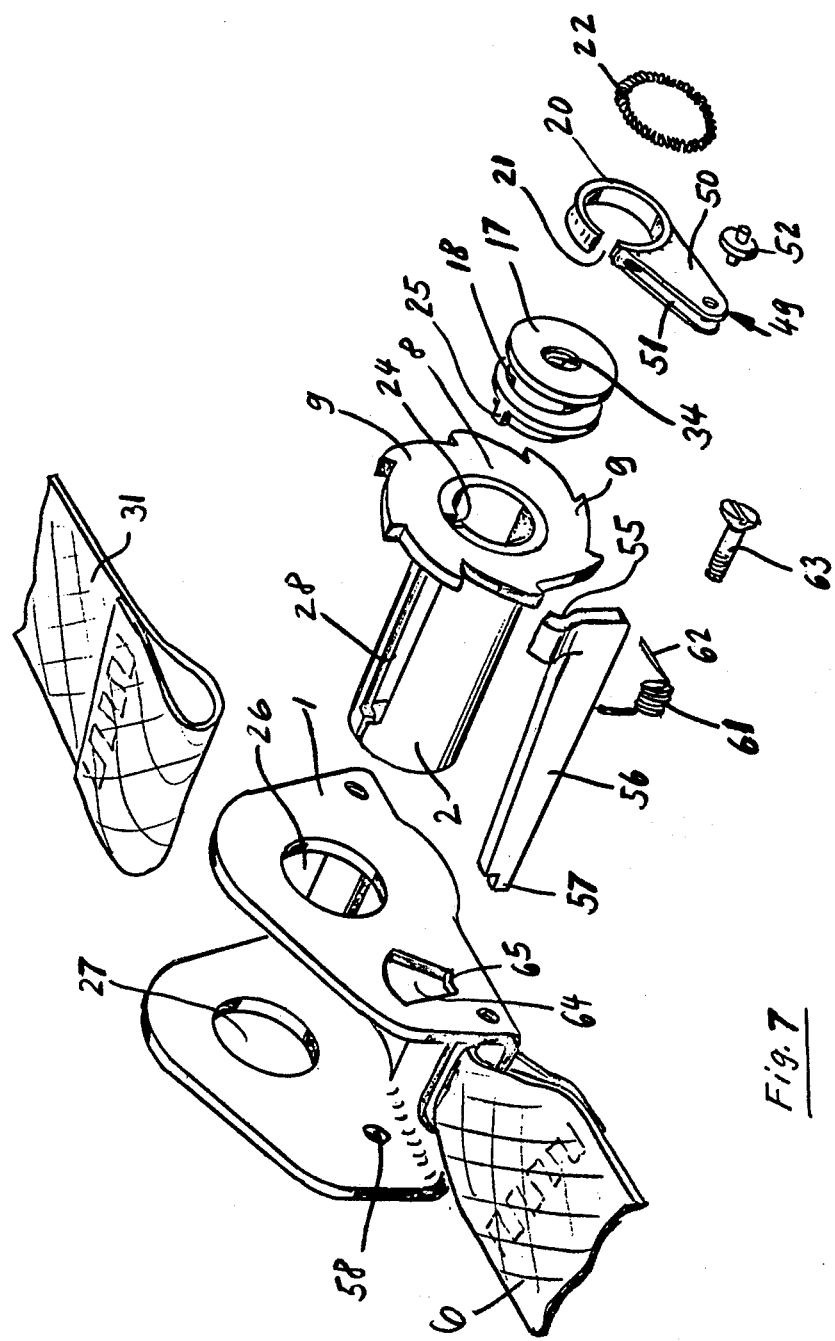
FIG. 7 represents an exploded view of a modified device according to the invention.
Figure 8:
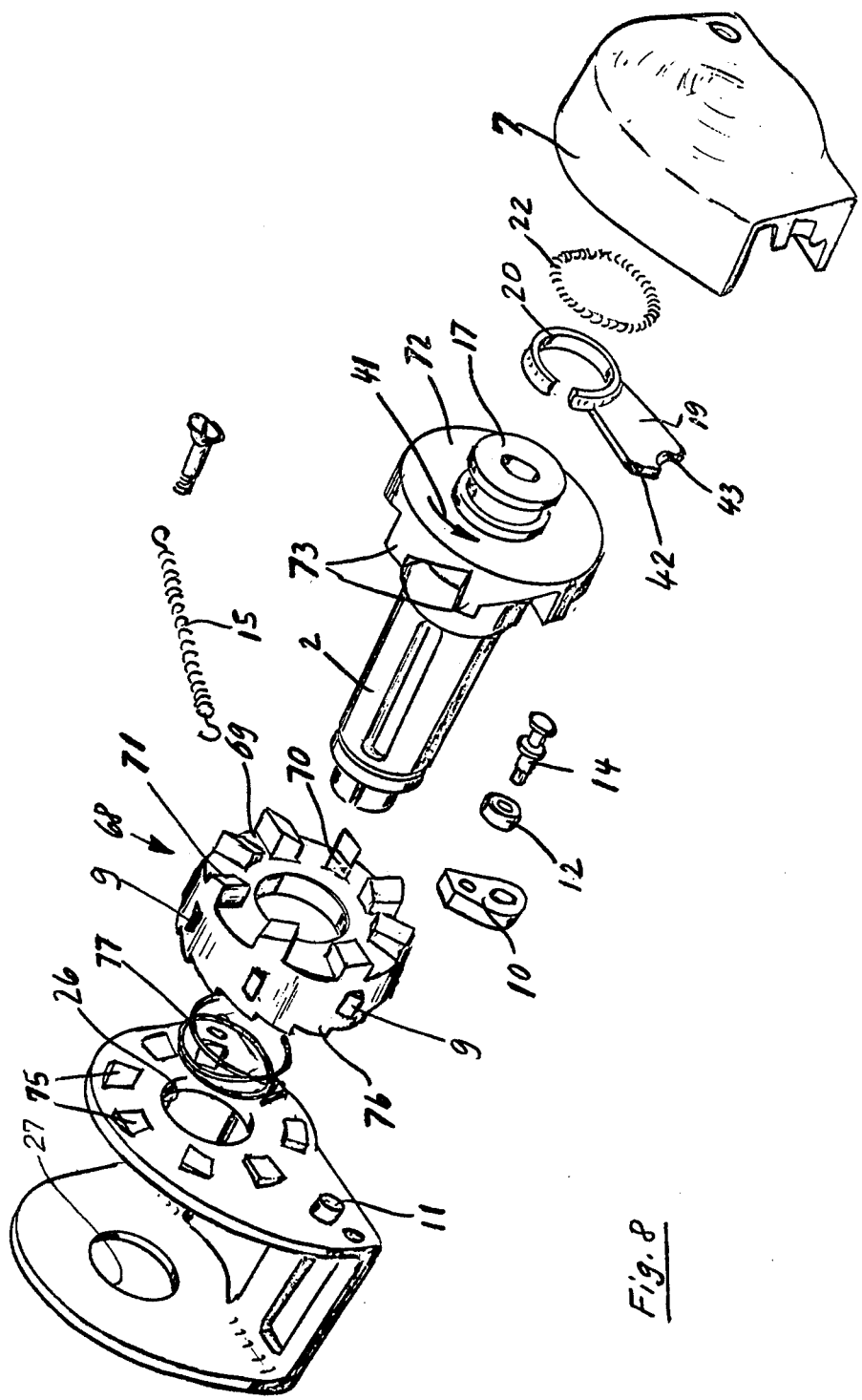
FIG. 8 is an exploded view of still another modification of the invention but with an axially effecting blocking device.

The individual elements illustrated in FIG. 7 and pertaining to a modified and structurally simplified embodiment of a winding-up device according to the invention practically result in the same function as with the embodiment of FIGS. 1–6. As far as the same structural elements are employed in this embodiment as they have been described in connection with the first embodiment, the corresponding parts are designated with the same reference numerals as in FIG. 1. The control lever 49 which likewise forms one piece with a slotted hub portion has two side plates 50 and 51 (FIG. 7) between which a control roll 52 may be rotatably inserted if prior thereto the annular spring 22 which is laterally guided by said two side plates or walls is placed over the hub portion 20. Instead of the pawl 10 of the first embodiment, the arrangement of FIG. 7 has a blocking nose 55 which is formed onto a longitudinal metal strip 56. The metal strip 56 has that end section thereof which faces away from the nose 55 provided with an extension 57 of rectangular cross section by means of which it is journalled in a bore 58. A leg spring 62 comprising at least one winding is connected to the wide side of the metal strip 56. The spring 62 is by means of a screw 63, which is screwed into the housing and passes through the winding of the helical spring, a connected that it urges the nose 55 to tilt into the range of rotation of the radial teeth 9 of the ratchet disc 8. For purposes of fixing the tilting range, a sector-shaped recess 64 is provided in housing 1. The confining surface 65 adjacent the center of the recess 64 serves for engagement by or support for one of the two longitudinal edges of the metal strip 56. The nose 55 is in axial direction so wide that it laterally protrudes beyond the ratchet disc 8. Furthermore, the nose is angled off in such a way that the control roll 52 can engage its protruding range as if it were an arresting recess, as long as the winding-up device does not occupy its blocking position. In case of danger, the control roller 52 mounted on the control lever 49 is pivoted out of the range of the locking nose 55 to such an extent that the locking nose 55 can drop into the ratchet disc and bring about the locking operation. The embodiment of FIG. 8 is provided for extremely high belt forces and represents a further development of the first embodiment illustrated in FIG. 1. As far as the same structural elements are employed in FIG. 1, they are designated with the same reference numeral as in FIGS. 1-6. In contrast to the first embodiment, in the arrangement of FIG. 8, the pawl 10 does not at the same time also act as a part of the locking device. According to FIG. 8, the pawl 10 is rather employed as a precontrol lever. Pawl 10 cooperates with a ratchet disc 68 which similar to the ratchet disc 8 has its circumference provided with a greater number of radial teeth 9. In this instance, however, the ratchet disc is not fixedly connected to the winding-up shaft 2 but is rotatable relative thereto in a limited angle range. A clutch disc 69 forms one piece with the ratchet disc 68. The disc 69 has its end face provided with a plurality of axial cams 70. These cams are provided with inclined surfaces 71 which ascend in the belt pull-out direction 41. A supporting disc 72 which is fixedly connected to the winding-up shaft 2 cooperates with the clutch disc 69. The disc 72 has that end face thereof which faces toward the clutch disc 69 likewise provided with a greater number of axial cams 73. A ring of a plurality of blocking cams 75 is arranged on that wall portion of housing 1 which contains the bore 26. Arranged opposite said cams 75 is a corresponding number of axially directed counter teeth 76 which are provided on the ratchet disc 68 or on a supporting disc forming one piece with said ratchet disc 68.

When in the manner described in connection with the first embodiment of the invention the control lever for purposes of initiating a blocking operation frees the pawl 10 as illustrated in FIG. 5, the pawl 10 will in view of the thrust of tension spring 15 tilt toward the radial teeth 9 of the ratchet disc 68 and retain the same. Inasmuch as the ratchet disc 68 is loosely mounted on the winding-up shaft 2, said shaft 2 will be able together with its supporting disc 72 to move slightly further while the axial cams 70 and 73 slide along each other and displace the ratchet disc 68 together with its counter teeth 76 toward the housing to such an extent that the counter teeth get into mesh with the blocking cams 75 and block any further withdrawal of the belt. As soon as the pull on the belt subsides, a coupling spring 77 arranged between the housing and the ratchet disc 68 presses the counter teeth 76 out of their engaging position while axially displacing the ratchet disc 68, and then frees the winding-up shaft 2 so that the shaft 2 is again free to turn in one or the other direction in response to slow accelerations of the belt 31.

The pivoting of the pawl 10 into its starting position may be effected solely by the control lever 19 insamuch as the spring load can be selected considerably less.

Figure 9:
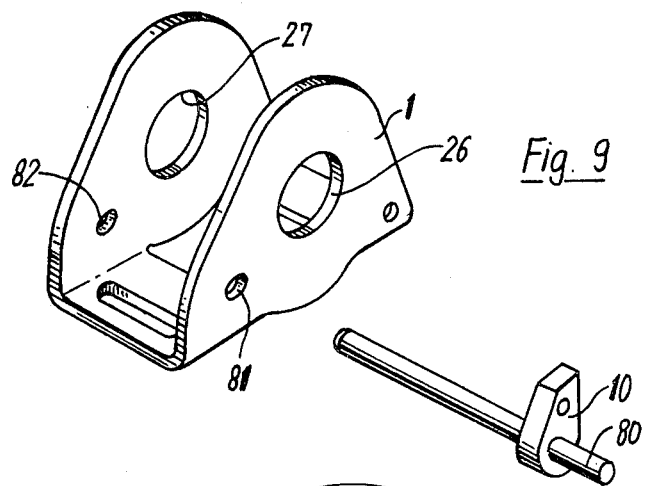
FIG. 9 represents a particularly advantageous design of the pawl mounting.

Whereas with the last mentioned three embodiments of the invention, the mechanical stresses exerted upon the pawl 10 employed for the precontrol are only slight, with an embodiment according to FIGS. 1 to 6, the load on the bearing of the pawl may, if it occurs during the locking operation, become rather high. Therefore, FIG. 9 illustrates an improved journalling for the pawl 10. In this instance, the pawl 10 is mounted on one of the two end zones of a shaft 80 extending all the way through, which is journalled in two bores 81 and 82 respectively arranged in the two side walls of the housing 1.

Inasmuch as shaft 80 can be mounted in sufficiently spaced arrangement with regard to the winding-up shaft 2, it is possible to select its diameter so great that its crossection will be able to withstand all occurring shearing forces.

FIGS. 11-31 illustrate further embodiments and improvements according to the invention by means of which the winding-up device according to the invention can be made still more effective as to its control.

FIG. 11 shows a top view of the control elements with a clutch having an inner band. One end of the control lever 85 has a closed hub portion 86 for receiving the inner brake band 87 which is made of a spring elastic synthetic material. At the end face on the extension 88 there is provided a follower 89 which is adapted to be fit with a slight follower play into a recess 90 of the clutch band 87. Preferably, the inner brake band 87 is thin-walled while for pre-loading thereof a pressure spring 91 is provided on the inner wall of the brake band.

FIG. 12 shows a modification according to which two bearing pins 93 and 94 are eccentrically mounted on the extension 92 for pivotally mounting the coupling jaws 95 and 96. These jaws 95 and 96 are by a pressure spring 97 pressed against the inner wall of the hub 86 of the control member 85 and thus in response to a jerky rotary acceleration of the winding-up shaft bring about a movement of the control member 85 in the direction of rotation and thus initiates the blocking operation while a follower moment is realized which increases with $e^{\mu\alpha}$ and exponentially increases with the looping angle $\alpha$. As will be evident from FIGS. 11 and 12, the brake band and brake jaws are under continuous spring pressure whereby it will be assured that during the winding-up operation the control part will be returned to its starting position. A change in the spring conditions acting upon the pawl will in this instance not be necessary.

FIG. 13 shows a further modification of a spring-free clutch the pawl of which is put under spring tension by a spring 98 which on one hand engages the bearing pin 14 and on the other hand engages an angled-off web 99 of the control part 100. The hub portion 101 serves for receiving the inner brake band 102 which has one end suspended in a cylindrical extension 103 of the extension 104 and more specifically in a transverse slot 105. The other free end 106 of said inner brake band 102 rests on the angled-off portion 107. When the winding-up shaft 2 is accelerated in the direction of the arrow 108A, the brake band is subjected to tension between the parts 106/107 and takes along the control part 100 in the direction of the arrow 108A.

Figure 14:
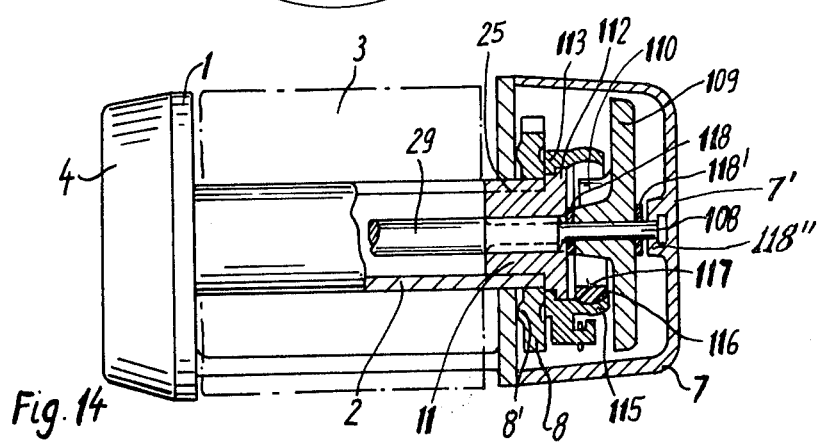
FIG. 14 represents a partial longitudinal section through a winding-up device according to FIG. 1.
Figure 15:
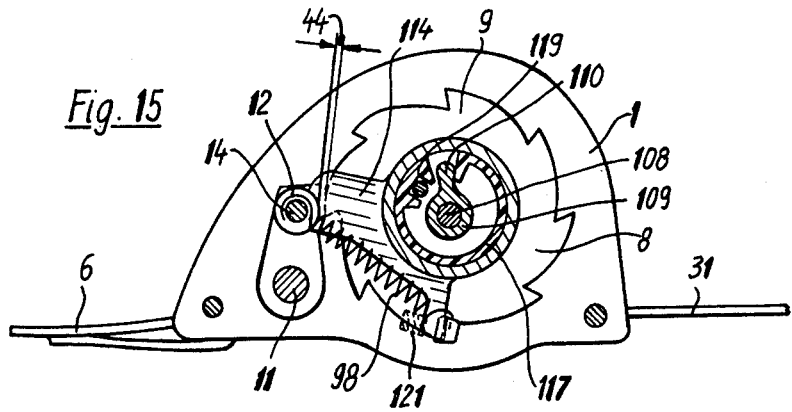
FIG. 15 is an axial view of the winding-up device according to the invention at the time when being called upon to function.
Figure 16:
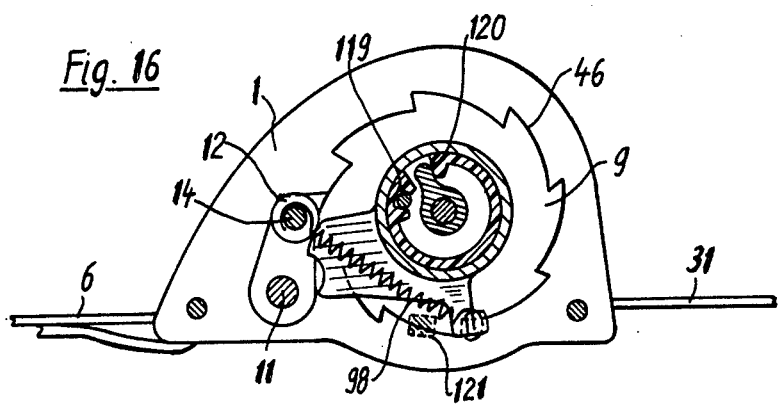
FIG. 16 shows the device of FIG. 15 during the start of its blocking action.
Figure 17:
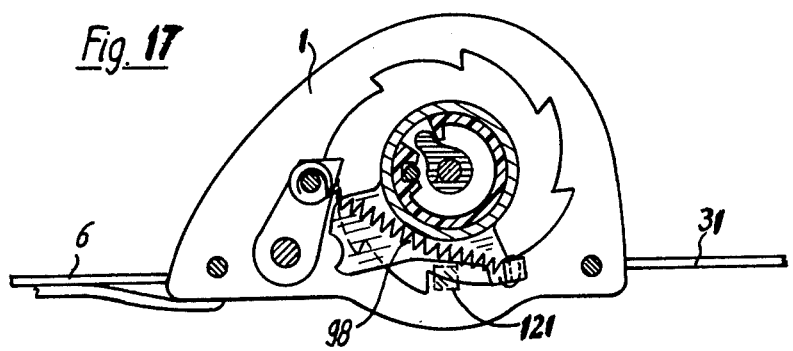
FIG. 17 shows the device of FIG. 15 in blocking action.

FIG. 15 shows an axial view of the winding-up device at the time it is made to act, said winding-up device being equipped with an additional inertia disc. FIG. 14 illustrates the pertaining longitudinal section with a partial section through the control elements. The bolt 29 has its front region designed in the form of a bearing pin 108 and serves for receiving the inertia disc 109 with its control cam 110. The extension 111 has a follower 25 which engages the groove 24 of the rolled sleeve forming the winding-up shaft 2 and yields a follower safety device. The ratchet disc 8 is by a plurality of dogs 8' held in spaced relationship to the housing 1. The extension 111 has a collar 112 on which the hub 113 is rotatably journalled. FIG. 15 shows more clearly the hub 113 of the control part 114. In the front range 115 of the hub, the bore has a concave inner surface 116 for axially guiding the inner brake band 117 which is made of suitable synthetic material and has a thin wall, Two discs 118 and 118' limit the axial play of the inertia disc 109. The cover cap 7 has its bottom 7' provided with a small bearing eye 118" by means of which the inertia disc 109 is held at the proper axial distance. Abutment cams, not illustrated and located in the cover cap, limit the rotary movement of the control part 114. At the end face of the extension 111 there is provided a follower 119 which is fitted with light play into a recess of the brake band 117. The second open end of the brake band 117 engages at 120 the counter cam 110 of the inertia disc 109. An abutment 121 fixedly connected to the housing is provided for limiting the stroke of the control lever.

Figure 18:
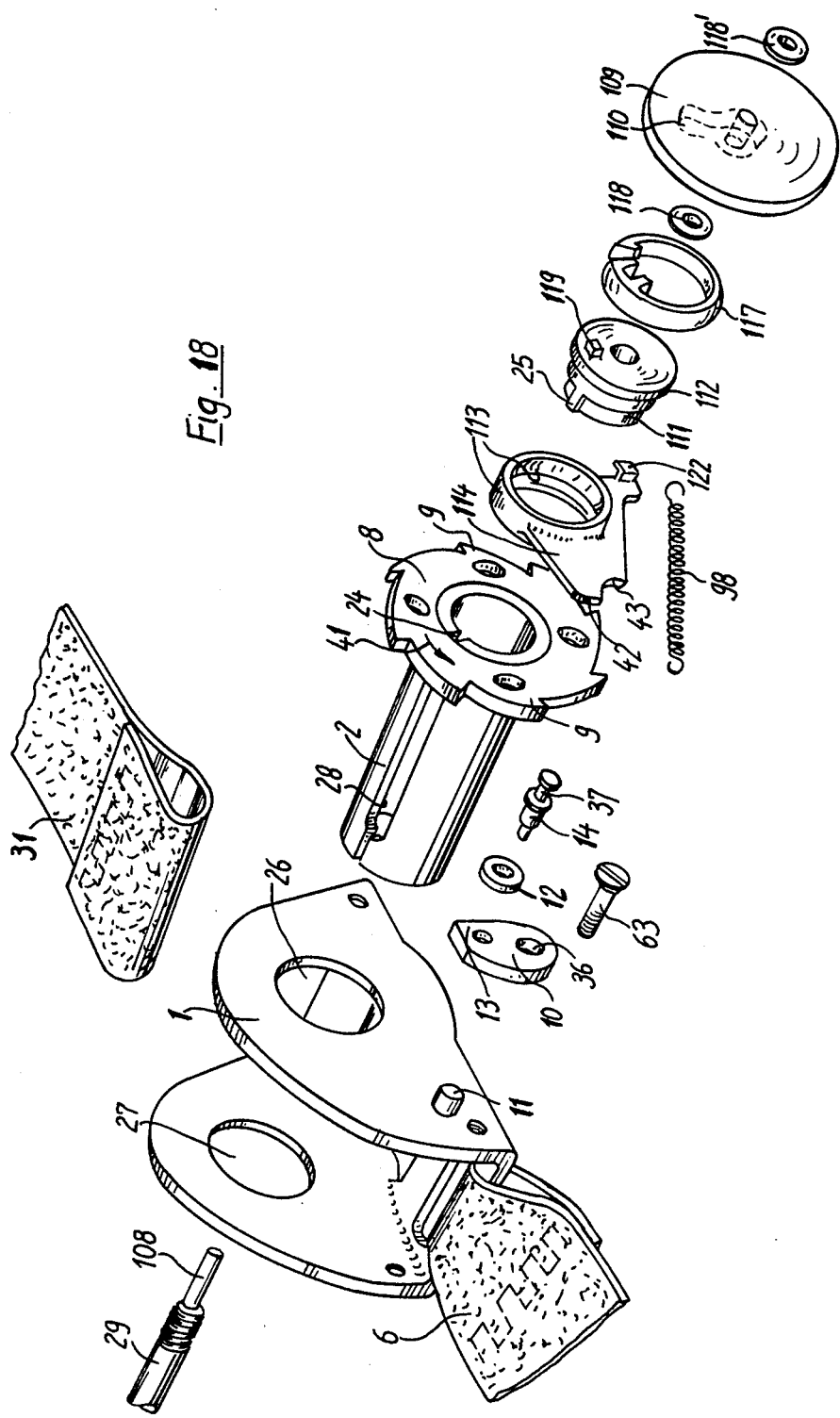
FIG. 18 is an exploded view of a winding-up device according to FIGS. 15-17.

FIG. 18 illustrates how the assembly of the individual control elements is effected. This figure furthermore shows that the tension spring 98 has its one end suspended on the bearing bolt 14 at 37 while its other end is suspended on the suspension web 122 of the control part 114.

Figure 19:
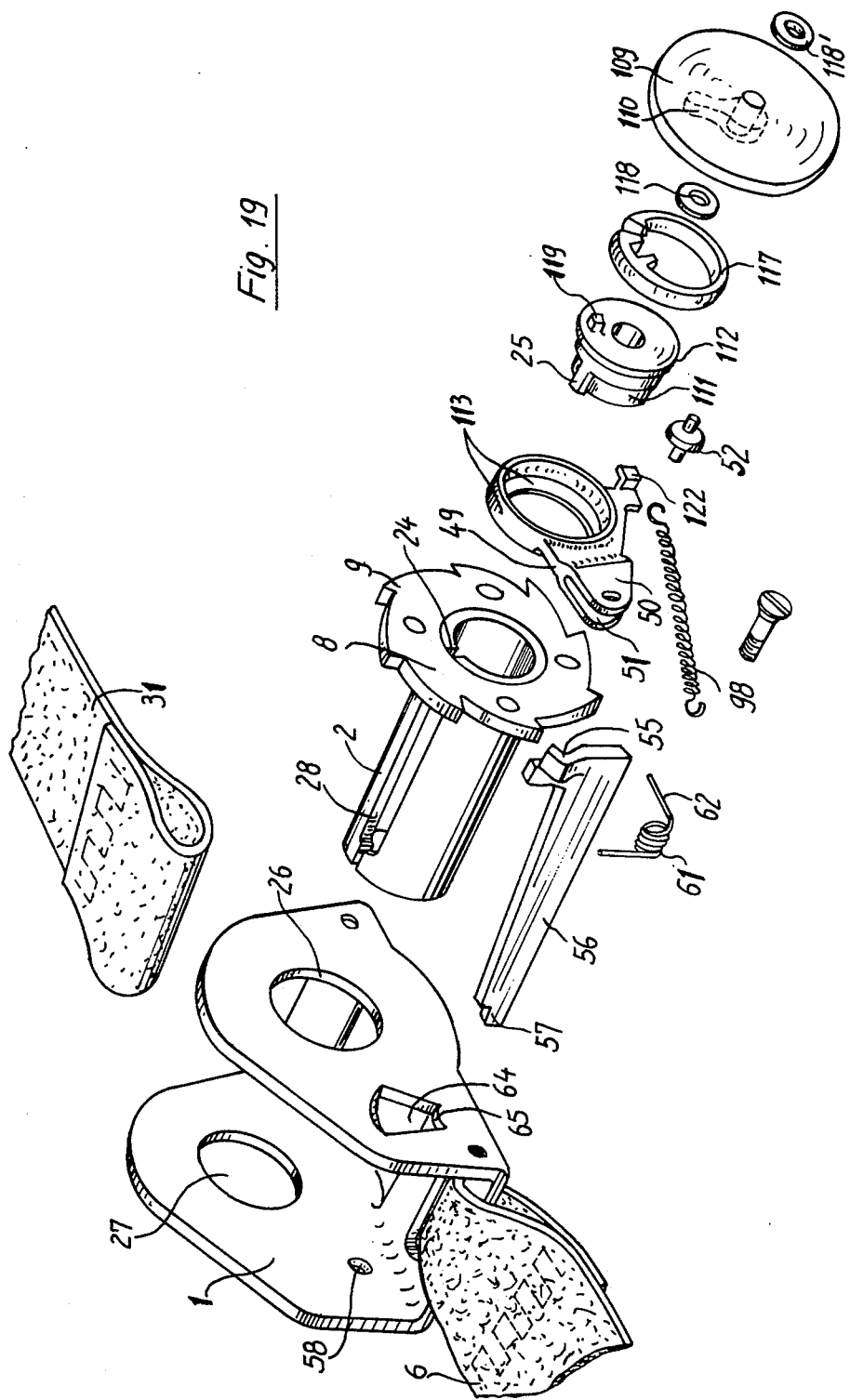
FIG. 19 is an exploded view of still another modification of the present invention.

FIG. 19 shows an exploded view of a modified embodiment of a winding-up device according to the invention. According to FIG. 19, the pawl is formed by a nose 55. The nose 55 is provided on a longitudinal metal strip 56 which is pivotable about one of its longitudinal edges while this longitudinal edge rests on the bottom 65 of a sector-shaped cutout 64 in one of the housing walls, said cutout at the same time limiting the tilting range of the metal strip. With this design, the control elements are constructed in the above mentioned manner. The control lever 49 is, similar to the embodiment of FIG. 7, provided with two lateral walls 50 and 51 between which a control roller is rotatably journalled. This control roller rests against the metal strip 56 which is tiltably mounted.

Figure 20:
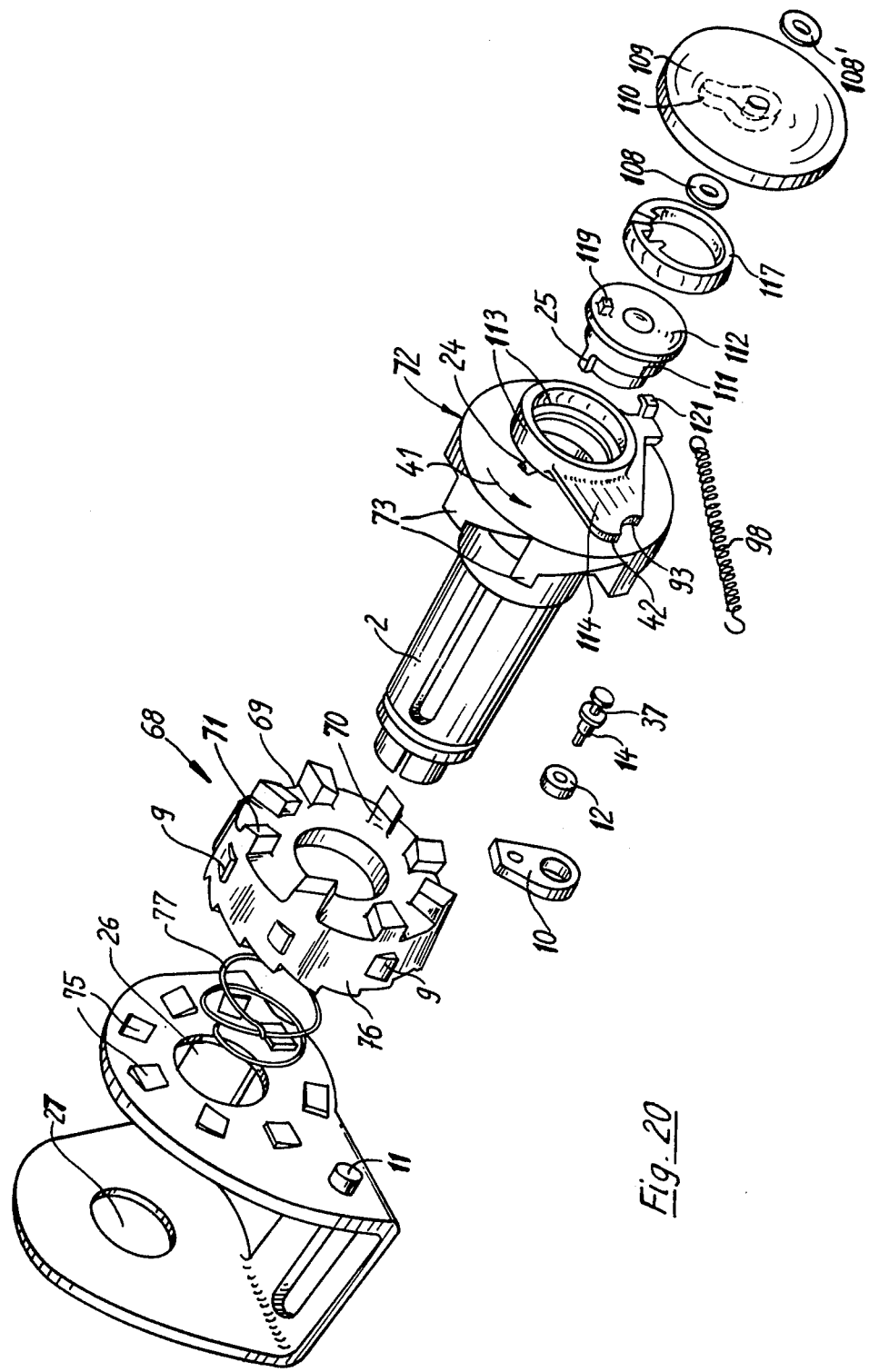
FIG. 20 is an exploded view of still another modification of the invention.

FIG. 20 shows an exploded view of still another embodiment of the invention. The here illustrated winding-up device has a supporting disc 72 which is fixedly mounted on the winding-up shaft 2 and which comprises a plurality of axial cams 73 the inclined surfaces of which ascend in a direction counter to the belt pull-off direction 41. The ratchet disc 68 rests with its axial cams 70 against said axial cams 73 and is displaceable against the thrust of a clutch or disengaging spring 77 until it engages stationary blocking cams 75 which are arranged on one of the housing walls. The pawl 10 serves as pre-control lever for initiating the blocking operation while said pawl cooperates with the arresting disc 68 which is rotatable relative to the winding-up shaft 2 over a limited angle and during this rotary movement brings about an axial displacement of the ratchet disc.

Figure 21:
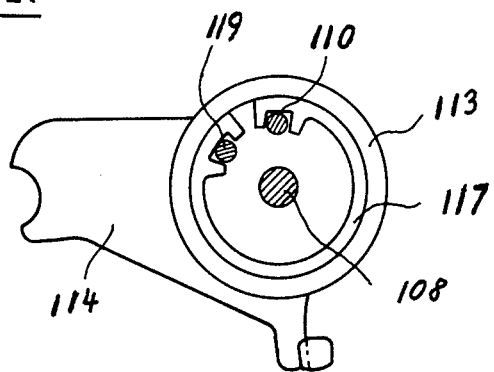
FIG. 21 is a top view of an advantageous design of the inner brake band of the control elements.

FIG. 21 illustrates an advantageous further development of the brake band suspension. As already mentioned in connection with FIGS. 15 to 20, the inner brake band is suspended on the follower pin 119 of the extension 111. The control cam of the inertia disc is in this instance adapted to be fitted between the open ends of the thin-walled inner spring band coupling with slight play. According to the embodiment shown in FIG. 21, an inner brake band 117 has its second free end likewise provided with a suspension groove in which the follower 110 of the inertia disc 109 is likewise fitable with slight play.

Figure 22:
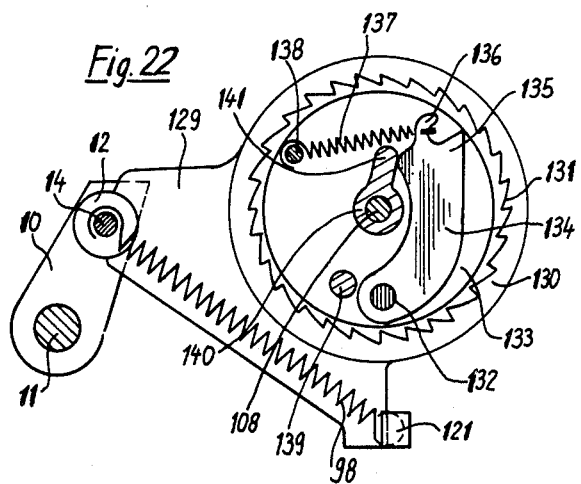
FIG. 22 is a top view of the control elements with a hub having inner teeth.

FIG. 22 shows a further embodiment of the control in which the control part 129 has its hub portion 130 provided with inner teeth 131 which cooperates with a latch 134 which is mounted on the extension 133 at 132. The latch 134 has a tooth-shaped extension opposite the pivot point 132. Within the region of this extension there is provided a suspension web 136 for a tension spring 137 which is suspended on a protrusion 138 of the extension 133. In its starting position, the radial inner location of the latch 134 is determined by an abutment pin 139 of the inertia disc 140. The control cam 141 located on the inner side of the inertia disc makes the control effective when the inertia disc due to its mass inertia begins to lag, and consequently a relative rotation between the winding-up shaft and the inertia disc occurs.

Figure 23:
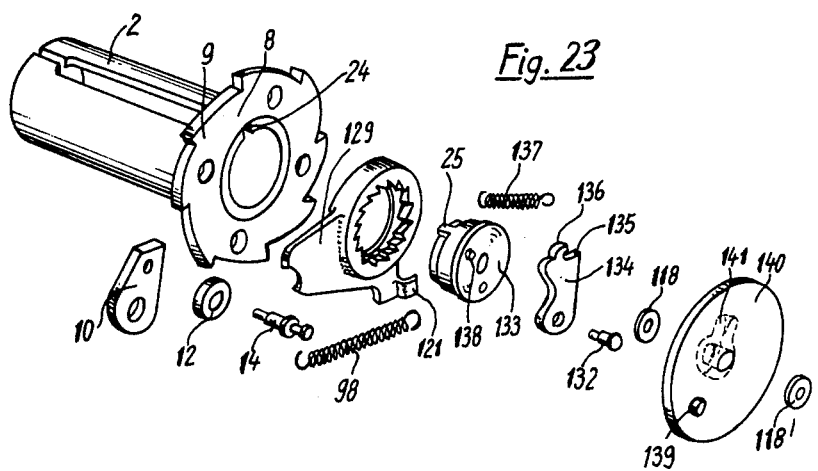
FIG. 23 shows an exploded view of the elements of FIG. 22.

FIG. 23 is an exploded view of the control device according to FIG. 23.

Figure 24:
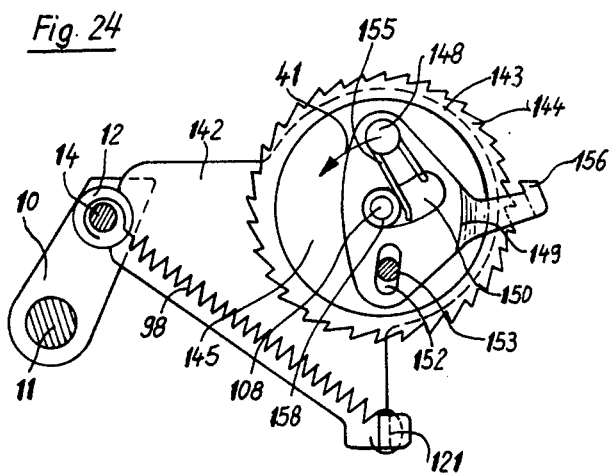
FIG. 24 is a top view of the control elements with a hub having outer teeth.
Figure 25:
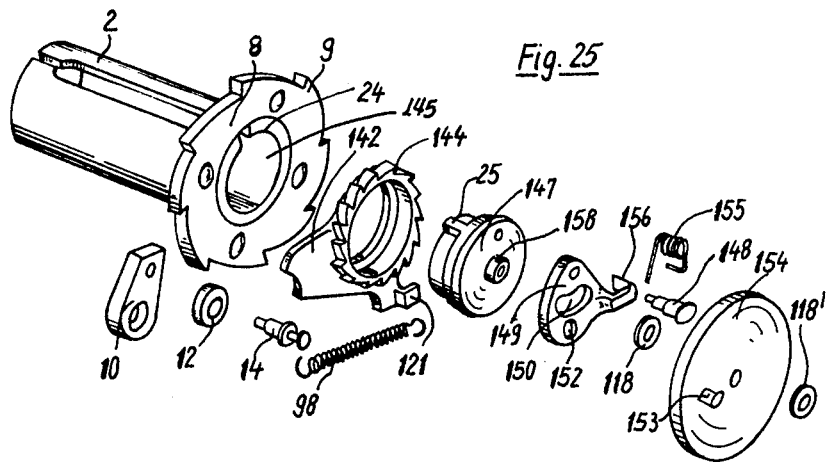
FIG. 25 illustrates by way of an exploded view the individual elements shown in FIG. 24.

With the embodiment according to FIGS. 24 and 25, instead of inner teeth as provided in FIGS. 22 and 23, there are provided outer teeth 144 on the hub 143 of the control member 142. In the drum-shaped hollow chamber 145 of the hub portion 143 there is provided on the extension 147 a bearing bolt 148 for pivotally mounting the pivotable latch 149 which extends over the rim of the hub portion 143. The outwardly located end face of the extension 147 is provided with a small hollow cylindrical neck 158 which at the samt time serves as limitation of the movement of the pivotal latch 149. Within the region of the neck 158, the latch 149 has an oblong hole 150. Opposite the bearing bolt 148 there is provided a slot 152 through which extends a follower 153 of the inertia disc 154. A leg spring 155 which on one hand is rotatably mounted on the bearing bolt 148 rests with one of its legs in the oblong hole 150 thereby holding the pivotable latch 149 in its starting position. The pivotalbe latch 149 has its portion which is located outside the teeth 144 provided with a gripper finger 156. When the belt is pulled off at an accelerated rate, due to the mass inertia, the point 152/153 temporarily stops, and the bearing bolt 148 moves in the direction of rotation 141 further thereby causing the gripper finger 156 of the latch 149 to engage the teeth 144 of the control part 142 so that the latter is instantaneously taken along and the blocking operation is initiated.

FIG. 25 shows an exploded view of the device of FIG. 24.

Figure 26:
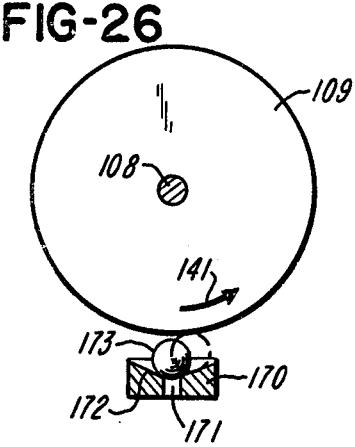
FIG. 26 is an axial top view of the inertia disc of another embodiment of the invention with a control device which becomes effective in response to certain acceleration and retardation factors of the vehicle.
Figure 27:
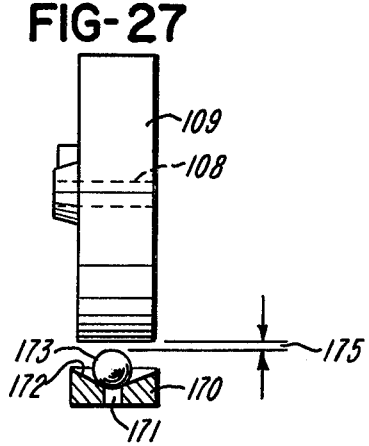
FIG. 27 shows the device of FIG. 26 as seen from the right-hand side of the drawing.

According to the embodiment of FIGS. 26 and 27, an inertia disc 109 of the type illustrated in FIGS. 14 to 18 is provided which is rotatably arranged on the above described bearing pin 108. The axis of the tubular guiding body 170 is arranged in the vertical plane which passes through the axis of the bearing pin 108. The central longitudinal bore 171 of the guiding body 170 merges with a conical end face 172 which serves as a supporting surface for a locking ball 173 acting as mass body. The conicity of the conical end face 172 is selected so that the radial distance of this end face will decrease progressively in the direction of the rotation 141 as it occurs when pulling out the safety belt. When a predetermined acceleration value or retardation value is exceeded and the ball 173 moves in the direction of the arrow 141, a clamping occurs by which the inertia disc 109 is braked relative to the tubular member 170 connected to the vehicle whereupon the blocking operation is initiated. As will be seen from FIG. 27, the mass ball 173 when occupying its normal position has a slight radial play 175 with regard to the circumferential surface of the inertia disc 109. This radial play is overcome only when the mass ball 173 at the time the predetermined retardation value is exceeded, is lifted out of its illustrated rest position and moves against the circumferential surface of the inertia disc 109.

Figure 28:
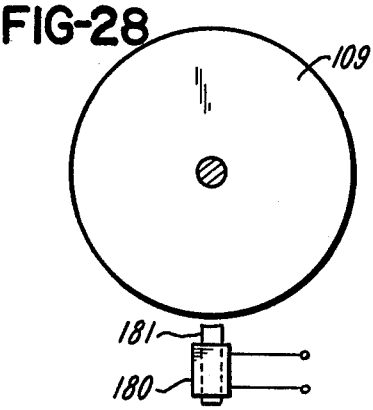
FIG. 28 illustrates an axial top view of an inertia disc of another winding-up device according to the invention in which an electromagnetic brake is provided.
Figure 29:
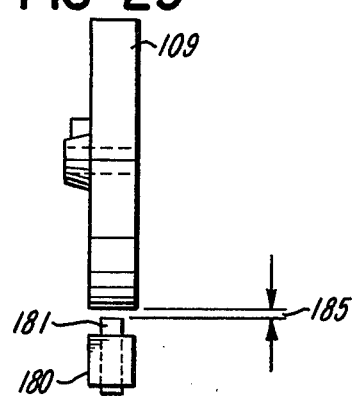
FIG. 29 is a side view of FIG. 28 as seen in a direction transverse to the axis of rotation of the inertia disc.

With the embodiment of FIGS. 28 and 29, it is assumed that an acceleration or retardation responsive control device, especially electric control device, is connected to the vehicle on which the winding-up device provided with an inertia disc 109 for a safety belt is fastened. This control device is movable from its stable rest postion when the acceleration or retardation of the vehicle exceeds a fixed minimum value. Furthermore, it is provided that by such control device hydraulic, pneumatic, or according to FIGS. 28 and 29, electrical braking forces are released. With the illustrated embodiment, an electromagnet 180 is provided the anchor 181 of which is arranged with slight radial play opposite the circumferential surface of an inertia disc 109 as long as the anchor is in its normal position and a predetermined limit value for the acceleration or retardation of the vehicle is not exceeded. As soon as this limit value is exceeded, the winding of the electromagnet 180 receives current and presses the anchor 181 against its circumferential surface of the inertia disc 109. This disc is then considerably braked and initiates the blocking operation in the manner described above.

Figure 30:
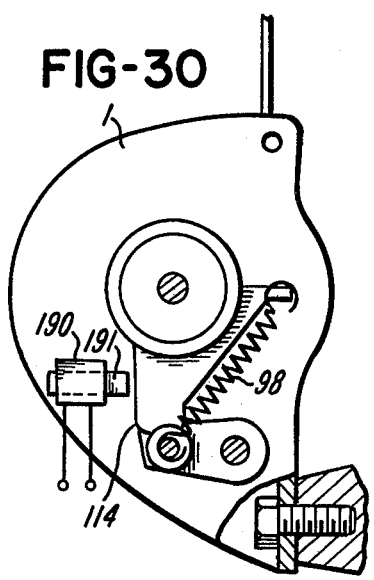
FIG. 30 illustrates a winding-up device according to FIGS. 13-17, in which the release of the control lever is effected by means of an electromagnet.

With an embodiment according to FIG. 30 an arrangement for the control lever and its return spring 98 is provided of the same type as it has been discribed in connection with FIGS. 14–18. In addition to the features provided in connection with FIGS. 14 and 18, according to the embodiment of FIG. 30, a safety device including an electromagnet 190 is provided; in response to the limit value of the acceleration preferably of the retardation of the non-illustrated vehicle being exceeded, the safety device built into the vehicle presses its anchor 191 against the control lever 114 and lifts the same out of its rest position thereby initiating the blocking operation.

It is, of course, to be understood that the present invention is, by no means, limited to the specific showing in the drawings but also comprises any modifications within the scope of the appended claims.

what is claimed is:

1. In combination with a winding-up device for a vehicle safety belt including a pawl member, a housing pivotally journalling said pawl member, an inertia disc separate from the pawl member and a winding-up shaft normally freely rotatable in the housing in both pay-out and take up directions and adapted for connection to one end of a safety belt said winding-up shaft having means thereon engageable with said pawl member for blocking rotation of said shaft, said pawl member being moveable between disengaged and engaged blocking positions with said shaft, spring means engaging said pawl member to bias said pawl member toward its blocking position, the inertia disc being journalled rotatably though axially unshiftable upon the shaft, a return spring biasing said shaft in take up direction said inertia disc rotating relative to said shaft in one direction when said shaft is accelerated in a belt pay-out direction, a braking member responsive to vehicle acceleration and movable out of rest position thereof to effect braking of the inertia disc a coupling means controlled by the inertia disc during said relative rotation with respect to the shaft, a single-lever-arm-release control part securely coupled with the shaft by said coupling means, said single-lever-arm-release control part normally holding said pawl member in disengaged position, said coupling means having a rest position wherein said coupling means is free of connection with said single-lever-arm-release control part, and a control cam means connected with said inertia disc, said control cam means functioning to transfer said coupling means into coupling position during said relative rotation of said inertia disc wherein said coupling means is rigidly connected with said single-lever-arm-release control part to effect rigid connection between said winding-up shaft and said single-lever-arm-release control part to effect release of said pawl member and consequent blocking of said shaft.

2. In a winding-up device for a safety belt: a housing, a winding-up shaft normally freely rotatable in the housing in both pay-out and take-up directions and adapted for connection to one end of a safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member, and a release element carried by said shaft and engaging said pawl member and normally holding the pawl member spaced from said toothed member in pay-out direction, spring means biasing said pawl member toward engagement with said toothed member upon release of the pawl by the release element, an interia body coaxial with said shaft and normally rotatable therewith, said interia body rotating relative to said shaft in one direction when said shaft is accelerated in pay-out direction and coupling means operated by movement of said interia body relative to said shaft in said one direction to couple said shaft to said release element, and braking means operated by acceleration or retardation of said housing for braking said interia body.

3. A device according to claim 2, in which said inertia body has a cylindrical outer surface and said braking means comprises a rollable element adjacent the outer surface of the inertia body and a support for said rollable element having a support surface rollingly supporting said rollable element and which converges with the outer surface of said inertia body so as to wedge the rollable element against said inertia body when the rollable element is displaced along said support surface, said rollable element in rest position on said support surface being radially spaced from the outer surface of said inertia body.

4. In a winding-up device for a safety belt: a housing, a winding-up shaft normally freely rotatable in the housing in both pay-out and take-up directions and adapted for connection to one end of a safety belt; a return spring biasing said shaft in take-up direction, and locking means responsive to rotary acceleration of said shaft in pay-out direction for locking said shaft to said housing rotation therein in pay-out direction, said locking means comprising a toothed member on said shaft, a a pawl member tiltable in said housing and engageable with said toothed member, and a release element carried by said shaft and engaging said pawl member and normally holding the pawl member spaced from said toothed member in pay-out direction, spring means biasing said pawl member towards engagement with said toothed member upon release of the pawl by the release element, an inertia body coaxial with said shaft and normally rotatable therewith, said inertia body rotating relative to said shaft in one direction when said shaft is accelerated in pay-out direction, and coupling means operated by movement of said inertia body relative to said shaft in said one direction to couple said shaft to said release element, brake means for braking said inertia body, and electric means including inertia switch means for actuating said brake means.

5. In a winding-up device for a safety belt: a housing, a winding-up shaft normally freely rotatable in the housing in both pay-out and take-up direction and adapted for connection to one end of the safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member, and a release element carried by said shaft and engaging said pawl member and normally holding the pawl member spaced from said toothed member in pay-out direction, spring means biasing said pawl member towards engagement with said toothed member upon release of the pawl by the release element, said release element having a hub portion engaging a circumferential surface on said shaft, an inertia body coaxial with said shaft normally rotatable therewith, said inertia body rotating relative to said shaft in one direction, when said shaft is accelerated in pay-out direction, coupling means operated by movement of said inertia body relative to said shaft in said one direction to couple said shaft to said release element, and braking means, operated by acceleration or retardation of said housing for braking said inertia body.

6. In a winding-up device for a safety belt: a housing, a winding-up shaft normally freely rotatable in the housing in both pay-out and take-up directions and adapted for connection to one end of a safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member, and a release element carried by said shaft and engaging said pawl member and normally holding the pawl member spaced from said toothed member in pay-out direction, spring means biasing said pawl member towards engagement with said toothed member upon release of the pawl by the release element, said toothed member being rotatable on said shaft, said shaft and toothed member having cooperating elements of cam means thereon operable upon rotation of the shaft in pay-out direction while said toothed member is held against rotation to move said toothed member in one direction axially, cooperating elements of circumferentially facing abutment means on said toothed member and housing interengageable when said toothed member is moved axially in said one direction, and spring means biasing said toothed member axially in the other axial direction, an inertia body coaxial with said shaft and normally rotatable therewith, said inertia body rotating relative to said shaft in one direction, when said shaft is accelerated in pay-out direction, coupling means operated by movement of said inertia body relative to said shaft in said one direction to couple said shaft to said release element, and braking means operated by acceleration or retardation of said housing for braking said inertia body.

7. In a winding-up device for a safety belt: a housing, a winding-up shaft normally freely rotatable in the housing in both pay-out and take-up directions and adapted for connection to one end of a safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member and a release element carried by said shaft and engaging said pawl member and normally holding the pawl member spaced from said toothed member in pay-out direction, spring means biasing said pawl member towards engagement with said toothed member upon release of the pawl by the release element, said release element having a hollow hub portion coaxial with said winding-up shaft, coupling means inside said hub portion for connecting said hub portion to said shaft when the shaft is accelerated in pay-out direction, an inertia body coaxial with said shaft normally rotatable therewith, said inertia body rotating relative to said shaft in one direction, when said shaft is accelerated in pay-out direction, said coupling means being operated by movement of said inertia body relative to said shaft in said one direction to couple said shaft to said release element, and braking means, operated by acceleration or retardation of said housing for braking said inertia body.

8. A device according to claim 7, in which said shaft comprises an extension on which said hub portion is mounted and said couplding means being in the form of a discontinuous band with opposite ends in said hub portion and having one end connected to said extension and having said inertia body cooperating with the other end of the band to expand it radially in order to clutch said release element to said shaft.

9. A device according to claim 8, in which said coupling means resiliently engages the inside of said hub portion and supports the hub portion on the axis of said shaft.

10. A device according to claim 8, in which the end of said band is connected to said extension follows when the shaft rotates in pay-out direction.

11. In a winding-up device for a safety belt: a housing, a winding-up shaft normally freely rotatable in the housing in both pay-out and take-up directions and adapted for connection to one end of a safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member, and a release element carried by said shaft and engaging said pawl member and normally holding the pawl member spaced from said toothed member in pay-out direction, spring means biasing said pawl member towards engagement with said toothed member upon release of the pawl by the release element, an inertia body coaxial with said shaft and normally rotatable therewith, said inertia body rotating relative to said shaft in one direction when said shaft is accelerated in pay-out direction and couplding means operated by movement of said inertia body relative to said shaft in said one direction to couple said shaft to said release element, said release element having a hollow hub portion coaxial with said shaft and said coupling means comprising a band inside said hub portion having the end thereof which is trailing in pay-out direction of said shaft connected to the shaft and the other end connected to said inertia body.

12. In a winding-up device for a safety belt: a winding-up shaft normally freely rotatable in the housing in both pay-out and take-up directions and adapted for connection to one end of a safety belt, a return spring biasing said shaft in take-up direction, and locking means responsive to rotary acceleration of said shaft in pay-out direction for locking said shaft to said housing against rotation therein in pay-out direction, said locking means comprising a toothed member on said shaft, a pawl member tiltable in said housing and engageable with said toothed member, and a release element carried by said shaft and engaging said pawl member and normally holding the pawl member spaced from said toothed member in pay-out direction, spring means biasing said pawl member towards engagement with said toothed member upon release of the pawl by the release element, an inertia body coaxial with said shaft and normally rotatable therewith, said inertia body rotating relative to said shaft when said shaft is accelerated in pay-out direction, and couplding means operated by movement of said inertia body relative to said shaft, in said one direction to couple said shaft to said release element, said release element having an externally toothed hub portion coaxial with said shaft, a lever having one end pivoted to an eccentric point on said shaft and the other end engageable with the teeth on said hub portion, a spring biasing said other end of said lever away from the teeth on said hub portion, and means on said inertia body engaging said pawl member and operable when said inertia body moves in said one direction relative to said shaft upon acceleration of said shaft in pay-out direction to moe the free end of said pawl member into engagement with the teeth on said hub portion.

* * * * *